(12) United States Patent
Carawan et al.

(10) Patent No.: US 6,200,465 B1
(45) Date of Patent: Mar. 13, 2001

(54) FILTER WITH INTEGRAL LIFT TAB

(75) Inventors: Paul Jennings Carawan, Gastonia; Bruce Edward Coffey, Charlotte, both of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/369,272

(22) Filed: Aug. 6, 1999

(51) Int. Cl.$^7$ ................................................ B01D 17/12
(52) U.S. Cl. .................. 210/94; 55/318; 55/357; 55/385.3; 55/502; 55/521; 96/417; 210/238; 210/450
(58) Field of Search ................... 55/318, 357, 385.3, 55/502, 521; 210/85, 94, 238, 450, 232, 490, 493–499; 96/417

(56) References Cited

U.S. PATENT DOCUMENTS

| | | |
|---|---|---|
| 2,992,701 * | 7/1961 | White ........................................ 55/357 |
| 3,075,334 | 1/1963 | Nutting . |
| 3,581,478 | 6/1971 | Smith ........................................ 55/484 |
| 4,364,757 | 12/1982 | Leonatti .................................... 55/357 |
| 4,394,147 | 7/1983 | Caddy et al. ............................. 55/357 |
| 5,024,760 * | 6/1991 | Kemper .................................. 210/232 |
| 5,735,918 * | 4/1998 | Barradas .................................. 55/521 |

FOREIGN PATENT DOCUMENTS

380026 * 8/1990 (EP) ........................................ 55/357

* cited by examiner

Primary Examiner—Joseph W. Drodge
(74) Attorney, Agent, or Firm—Millen, White, Zelano & Branigan P.C.

(57) ABSTRACT

In order to facilitate removal of an air filter from a housing, the air filter has a flexible tab which provides a finger grip. In a preferred embodiment, the flexible tab is disposed between a molded gasket and an expanded metal screen which covers the downstream area or dirty side of a pleated filter media.

18 Claims, 3 Drawing Sheets

FILTER WITH INTEGRAL LIFT TAB

FIELD OF THE INVENTION

The present invention is directed to a filter element with an integral lift tab. More particularly, the present invention is directed to filter elements which are periodically replaceable and include lift tabs.

BACKGROUND OF THE INVENTION

As automotive design evolves, there is constant effort to reduce weight and to make engine and drive train components smaller and more compact in order to conserve space. Generally, space allotments in vehicle design favor increasing space in a vehicle's cabin while reducing space in the engine compartment. As space in the engine compartment becomes smaller, it becomes more and more difficult to service a vehicle's engine. It is therefore desirable to maintain or even increase access to engine components wherever possible, even as an engine's space allotment decreases.

In order to ensure fuel efficient operation of vehicles and to minimize polluting emissions it is necessary to periodically examine and replace air filters. As an engine compartment's space decreases, it becomes more and more difficult to conveniently position and mount an air filter for inspection since in order to inspect an air filter, it is necessary to open a housing containing the air filter to observe the dirty side of the air filter. If an air filter is not positioned with its dirty side facing upwardly, then observing the condition of an air filter becomes difficult. Accordingly, there may be a tendency for mechanics to simply avoid examining air filters with the inevitable consequence that vehicles not having proper air filter maintenance not a will have lower fuel efficiency and contribute emissions to pollution. While this, of course, is difficulty if there are only a few vehicles not properly maintained, however when thousands of vehicles are not properly maintained, general fuel consumption increases and air quality is adversely affected.

Not only is it necessary to observe an air filter, but in order to completely inspect an air filter it is necessary to remove the air filter from its housing. The paucity of space can make removing an air filter difficult because the air filter is mounted against a seat within an air intake housing and may have become slightly adhered in place. Since in many rapid maintenance situations the customer waits while his or her car is serviced, the mechanic frequently removes the air filter and takes it and shows it to the customer. If the air filter resists removal, then the mechanic is more than likely to simply leave it in place and tell the customer that it is not clogged, when in fact it may well be clogged. Thus, there is a need to have air filters which are readily removable from their housings.

While engine air filters are of immediate and specific interest with respect to easy removal and replacement, the same considerations are of interest with respect to other types of air filters, or liquid filters for that matter.

SUMMARY OF THE INVENTION

It is a feature of the present invention to provide a new and improved filter element wherein the filter element is configured for convenient removal from a housing.

In view of this feature and other features, the present invention is directed to a filter element for filtering a fluid flowing therethrough wherein the filter element comprises a filter media having an upstream face facing the fluid to be filtered, and a downstream face. A peripheral gasket is disposed around the filter media for mounting the filter media in a seat. A pull tab is disposed between the peripheral gasket and the filter media and extends out of the gasket to provide an arrangement for facilitating the removal of the filter element from the seat.

In a further aspect, the filter element is comprised of a pleated filter media with a gasket that seals between the pleats adjacent the downstream face of the filter media and in still a further aspect, the tab projects across the downstream face of the filter media.

In an additional aspect of the invention, the filter element is an air filter used for filtering combustion air for an internal combustion engine and seats within a filter housing in the air inlet of the engine.

DETAILED DESCRIPTION

Figure 1:
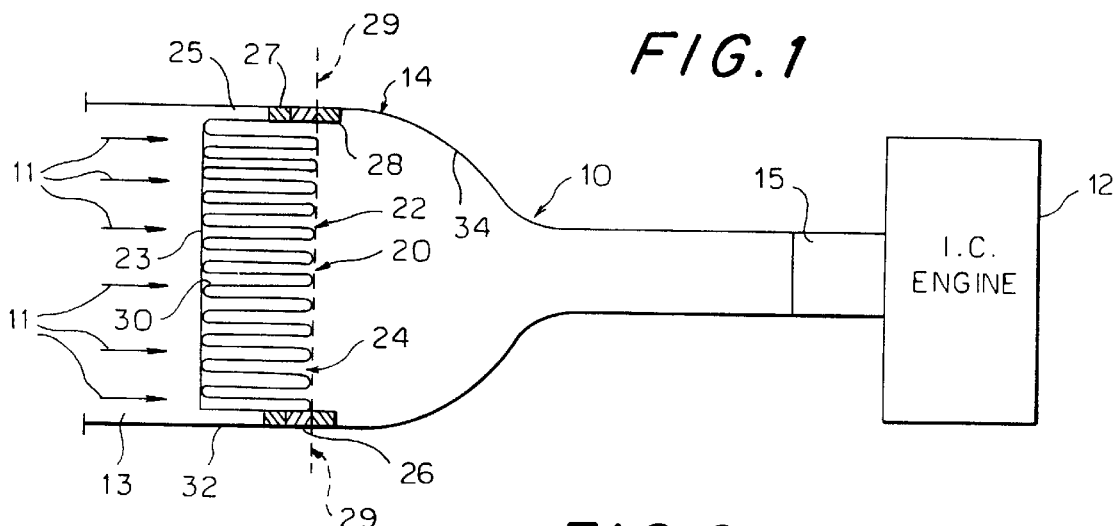
FIG. 1 is a schematic illustration showing the filter element of the present invention installed in a housing of an air intake of an internal combustion engine.

Referring now to FIG. 1, there is shown schematically a system 10 for supplying a stream of combustion air 11 to an internal combustion engine 12. The system 10 includes an inlet 13, a separable housing 14 and a connection 15 to the engine 12. Disposed within the separable housing 14 is a filter element 20, configured in accordance with the principles of the present invention. The filter element 20 includes a pleated filter media 22, which has an upstream area 23 and a downstream area 24. Disposed around the periphery 25 of the filter media 22 is a peripheral gasket 26 that is disposed between seats 27 and 28 of the separable housing 14. The seat 27 is an upstream seat while the seat 28 is a downstream seat. In order to inspect or exchange the filter the separable housing 14 opens along line 29—29.

Figure 2:
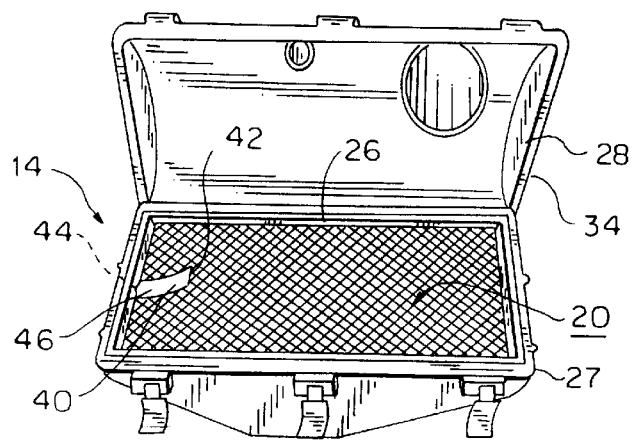
FIG. 2 is a perspective view, showing the housing opened so that the downstream side of the filter element is exposed.
Figure 3:
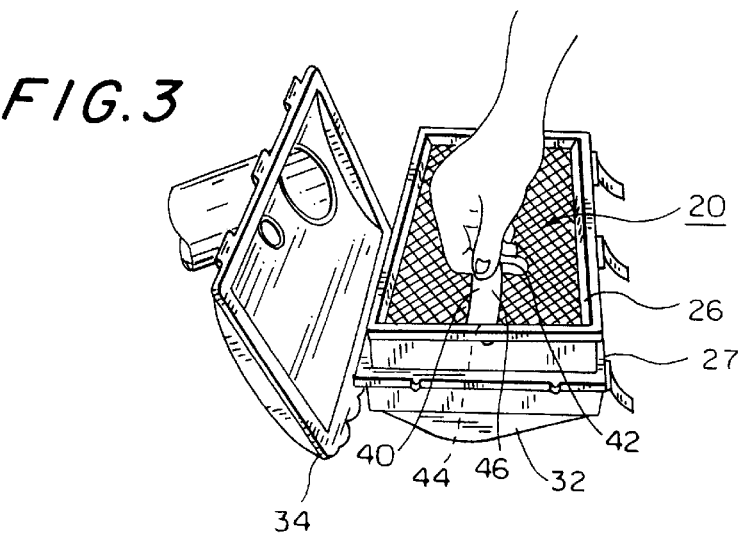
FIG. 3 is a view similar to FIG. 2 showing the filter element being removed from the housing.
Figure 4:
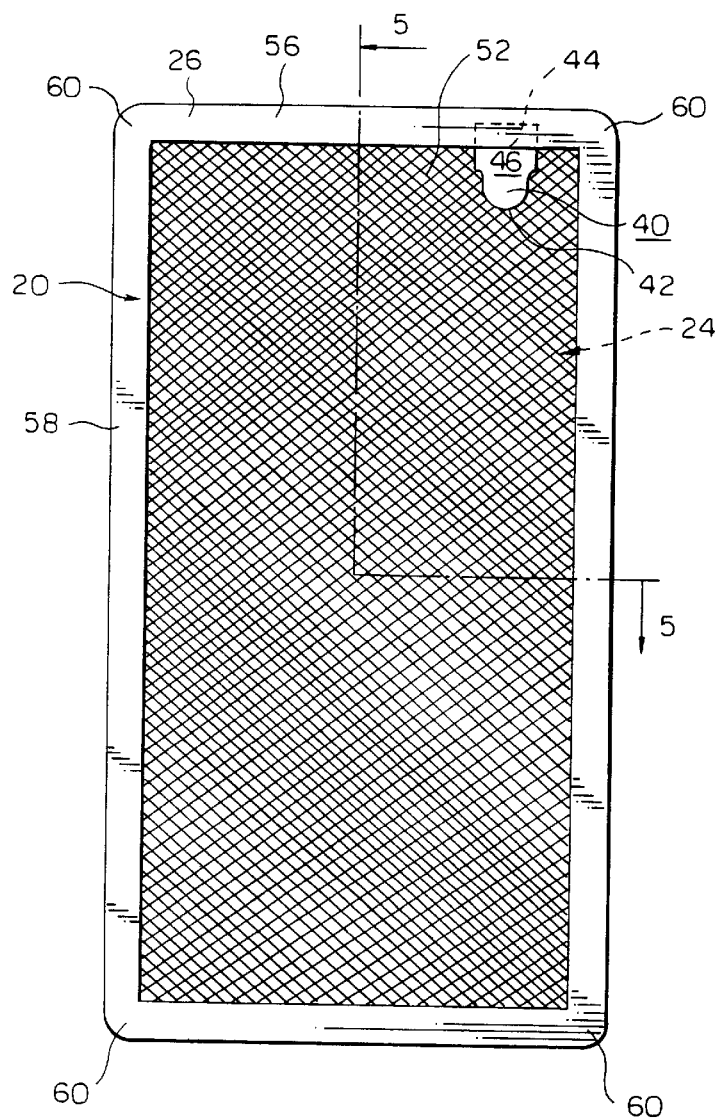
FIG. 4 is a planar view of the clean side or downstream of the filter element.
Figure 5:
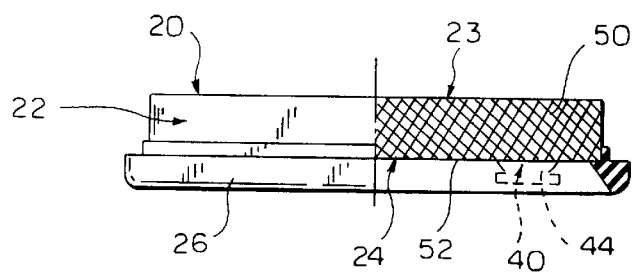
FIG. 5 is an end view of the filter element of FIG. 4 partially in section.
Figure 6:
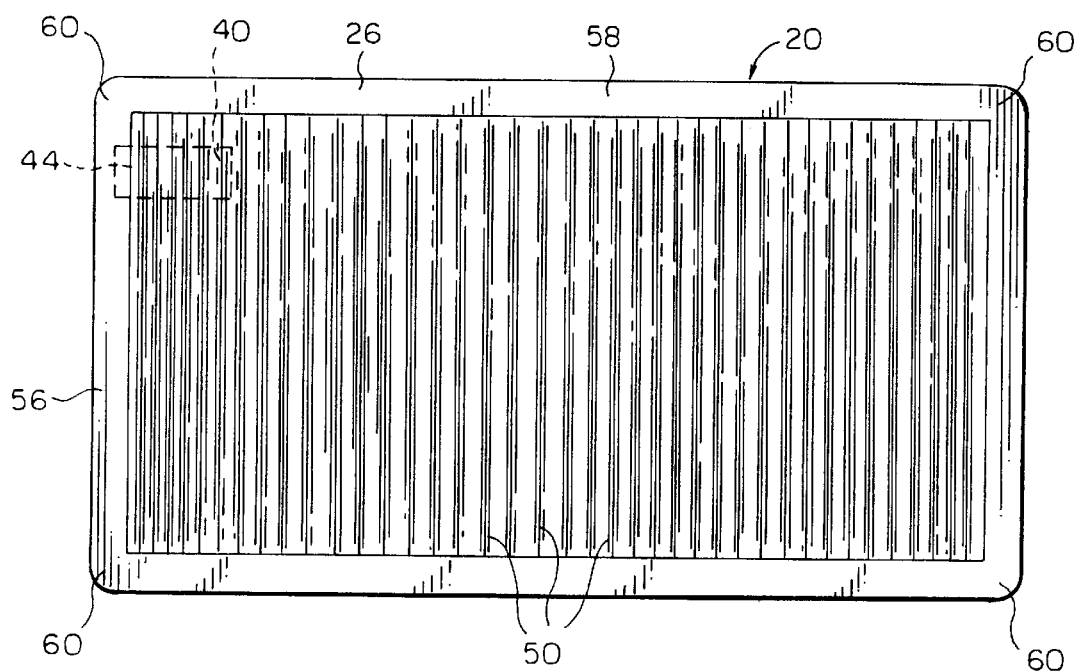
FIG. 6 is a side view of the filter element of FIGS. 4 and 5.
Figure 7:
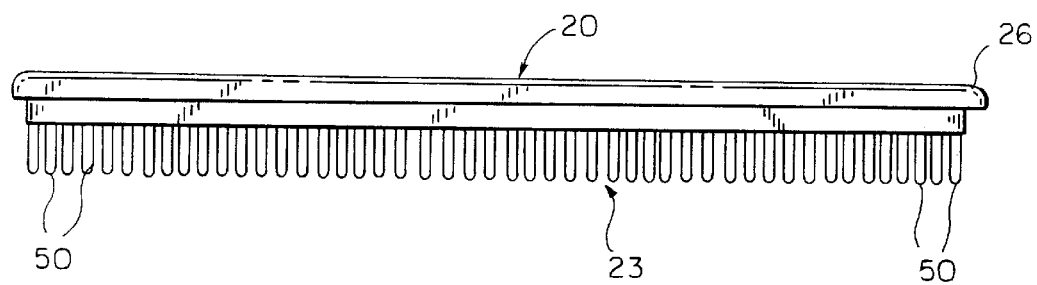
FIG. 7 is a planar view of the upstream dirty or upstream side of the filter element of FIGS. 4–7.

Referring now to FIGS. 2 and 3, a specific example of the housing 14 is shown wherein the housing includes an upstream shell 32 which is hinged to a downstream shell 34. When the housing 14 is opened, the filter element 20 remains seated on the upstream seat 27 of the upstream shell 32. As is evident from FIG. 2, removing the filter element from the upstream shell 32 in order to see if the upstream area 23 is clogged requires some effort and assistance. For example, a screwdriver may need to be used to pry the filter element 20 up so that the gasket 26 breaks free of the seat 27 if it has become adhered thereagainst. In accordance with the present invention, a pull tab 40 having free end 42 and an embedded end 44 with an exposed portion 46 of a sufficient area to allow gripping between a thumb and forefinger so that the filter element 20 may be readily removed from the upstream shell 32 for inspection and/or replacement.

As is seen in FIGS. 4–7, in the preferred embodiment of the invention, the filter element 20 has a depleted paper of cellulose filter media 50 wherein the downstream area 24 is surrounded by the peripheral gasket 26 and is covered by an expanded metal screen 52. In the preferred embodiment, the gasket 26 is molded of ethylene-propylenediene modified rubber. In accordance with the preferred embodiment of the invention, the tab 40 is placed between the expanded metal screen 52 and the gasket 26 on the downstream or clean side 24 of the filter element 20. Although other materials may be used such as plastic or even metal, it has been found that the pull tab 40 functions quite satisfactorily when made from filter media scrap, i.e., the same material from which the filter media 50 is made. This cellulose or paper material is flexible so that while air is being drawn through the filter media 50 and passes through the clean side 24 of the filter media 22, the pull tab 40 deflects away from the expanded metal screen 52 so as to minimize interference with the flow characteristics of the stream of air being filtered.

While the pull tab 40 is shown disposed on a short side 56 of the rectangular filter element 20, the tab may be disposed at other locations, such as along a long side 58 of the filter element or even in a corner 60 of the filter element.

Since the pull tab 40 is adjacent the downstream area or clean side of the filter element 20, it is exposed to filtered air. Accordingly, the pull tab 40 can be used as an indicator of the effectiveness of the filter media 50. If the filter media 50 is letting particulate matter pass therethrough, then the particulate matter will impinge on the pull tab 40 and may adhere thereto if the surface of the pull tab 40 is made tacky. In order to enhance this capability, a plurality of pull tabs 40 may be distributed around the periphery of the filter element 20 so that a person observing the tacky undersurface of the pull tabs 40 can determine if particles which have passed through the filter media 50 are adhered thereto.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

We claim:

1. A filter element for filtering a fluid flowing therethrough, the filter element comprising:
   a filter media having an upstream face facing the fluid to be filtered and a downstream face;
   a peripheral gasket configured of moldable material disposed around the filter media for mounting the filter element in a seat;
   a pull tab permanently attached to the filter element and extending outwardly therefrom to provide an arrangement for facilitating removing the filter element from the seat by pulling on the filter element pull tab attached to the filter element.

2. The filter element of claim 1, wherein the filter media is a pleated filter media and the moldable material of the gasket seals between pleats adjacent the downstream face of the filter media.

3. The filter element of claim 2, wherein a screen is disposed over the downstream face of the filter media between the filter media and material of the gasket and wherein the pull tab is disposed between the screen and material of the gasket.

4. The filter element of claim 3, wherein the screen is a metal screen.

5. The filter element of claim 4, wherein the metal screen is configured of expanded aluminum.

6. The filter element of claim 1, wherein the tab is made of filter media material and therefore serves as a visual indicator indicating the extent to which materials meant to be removed by the filter media have passed through the filter media by trapping the materials thereon.

7. The filter element of claim 1, wherein the material of which the gasket is made is ethylene-propylenediene modified rubber.

8. The filter element of claim 1, wherein the fluid is air or another gas.

9. The filter element of claim 1 wherein the pull tab is disposed between the peripheral gasket and the filter media.

10. The filter element of claim 9 wherein the pull tab is made of a flexible material.

11. The filter element of claim 10 wherein the filter media is a pleated filter media and the moldable material of the gasket seals between pleats adjacent the downstream face of the filter media the pull tab being co-molded with the gasket and pleated filter media.

12. A filter element for filtering inlet air for an internal combustion engine wherein the filter element is adapted to be removably seated on a seat in a housing connected by a duct to the internal combustion engine, the filter element comprising:
   a filter media having an upstream face facing an inlet of the housing and a downstream face facing the internal combustion engine;
   a peripheral gasket configured of material molded around the filter media for mounting the filter element on a seat;
   a pull tab disposed between the peripheral gasket and filter media and extending out of the gasket to provide an arrangement for facilitating removal of the filter element from the seat in the housing.

13. The filter element of claim 12, wherein the filter media is a pleated filter media and the material of the molded gasket seals between the pleats adjacent the downstream face of the filter media.

14. The filter element of claim 13 wherein a screen is disposed over the downstream face of the filter media between the filter media and material of the gasket and wherein the pull tab is disposed between the screen and material of the gasket.

15. The filter element of claim 14 wherein the screen is a metal screen.

16. The filter element of claim 15 wherein the metal screen is configured of expanded aluminum.

17. The filter clement of claim 12 wherein the tab includes an indicator incorporated therein indicating the extent to which materials meant to be removed by the filter media have passed through the filter media.

18. The filter element of claim 12 wherein the material of which the gasket is molded is ethylene-propylenediene modified rubber.

* * * * *